United States Patent [19]

Kamoto et al.

[11] Patent Number: 5,712,836
[45] Date of Patent: Jan. 27, 1998

[54] APPARATUS AND METHOD FOR ADJUSTING A ROTATIONAL VELOCITY OF A DISK STORAGE MEDIUM WITH MEASURING THE AMOUNT OF TIME TO REPRODUCE ADDRESS DATA STORED THEREON

[75] Inventors: Hidetoshi Kamoto; Shigeaki Wachi, both of Kanagawa, Japan

[73] Assignee: Sony Corporation, Tokyo, Japan

[21] Appl. No.: 622,670

[22] Filed: Mar. 26, 1996

Related U.S. Application Data

[62] Division of Ser. No. 331,928, Oct. 31, 1994, Pat. No. 5,640,383.

[30] Foreign Application Priority Data

Nov. 5, 1993 [JP] Japan .................... 5-276867

[51] Int. Cl.[6] .................................................. G11B 7/00
[52] U.S. Cl. .................................................. 369/50
[58] Field of Search .............................. 369/50, 48, 13, 369/275.3, 44.26

[56] References Cited

U.S. PATENT DOCUMENTS

| | | | |
|---|---|---|---|
| 4,819,218 | 4/1989 | Barnard | 369/50 |
| 5,253,243 | 10/1993 | Suzuki | 369/48 |
| 5,412,629 | 5/1995 | Shirane | 369/50 |

Primary Examiner—W. R. Young
Attorney, Agent, or Firm—William S. Frommer; Alvin Sinderbrand

[57] ABSTRACT

Apparatus and method for reproducing data from a CD-ROM at a constant angular velocity and for recording and reproducing data to and from a magneto-optical compact disc (CD-MO) at a constant angular velocity. Data reproduced from the CD-ROM is demodulated in accordance with an amount of reproduction time of a sync signal contained in the reproduced data. The clock rate of data to be recorded to or reproduced from the CD-MO is determined in accordance with the position or zone on the CD-MO at which the data is to be recorded or from which it is reproduced. The position or zone may be identified by address data which is reproduced from the CD-MO. In addition, a constant rotational velocity of the CD-MO is maintained by measuring an amount of reproduction time of the address data and varying the rotational velocity of the CD-MO in accordance with the measured reproduction time.

6 Claims, 13 Drawing Sheets

APPARATUS AND METHOD FOR ADJUSTING A ROTATIONAL VELOCITY OF A DISK STORAGE MEDIUM WITH MEASURING THE AMOUNT OF TIME TO REPRODUCE ADDRESS DATA STORED THEREON

This application is a division of application Ser. No. 08/331,928, filed Oct. 31, 1994, now U.S. Pat. No. 5,640,383.

BACKGROUND OF THE INVENTION

The present invention relates to a compact disk storage medium and a compact disk drive, and, more particularly, to disk storage medium and to apparatus for recording and reproducing data to and from a disk storage medium. The invention also relates to apparatus for recording and reproducing data at a constant angular velocity to and from a disk storage medium, and for adjusting the rotational velocity of the disk storage medium.

Currently, compact disks (CDs) are utilized for recording digital audio signals thereon by a known optical process. A 12 cm CD has a data storage capacity of approximately 640 megabytes and an 8 cm CD has a data storage capacity of approximately 200 megabytes. Hence, such CDs are useful for the storage of large quantities of digital audio data.

Compact disk read-only memories, known as CD-ROMs, store digital data, other than audio data, which are recorded in the same manner as audio data is recorded onto a CD. CD-ROMs generally are used in the 12 cm format, where spiral tracks of digital data are stored on the CD-ROM by a known optical process after the digital data is double-coded with a "cross interleave Reed-Solomon code" (CIRC) and modulated by an eight-to-fourteen (EFM) modulation process. Generally, each sector (i.e., information unit) of a CD-ROM stores one subcode block of data consisting of 98 frames. Each frame in an audio CD contains 8 bits of subcodes "P" to "W".

CD-ROMs are increasingly being used for the distribution of computer software because of their large storage capacity. Such uses include the storage of application software, statistical data (e.g., software encyclopedias), manuals, etc. In addition to their large storage capacity, CD-ROMs are well suited for mass reproduction because of their decreasing production costs and low error and failure rates.

The CD-ROM is an optical-type storage medium in which digital data is stored thereon with the disk being driven at a constant linear velocity (CLV), that is, the angular rotation of the disk varies in relation with the radial distance from the center of the disk of the location at which data is stored. When reproducing, a spindle motor in a CD-ROM drive rotates a 12 cm CD-ROM at the rotational (i.e., angular) velocity of 200 revolutions per minute (rpm) to reproduce data stored in the outermost tracks and rotates the disk at the rotational velocity of 535 rpm to reproduce data stored in the innermost tracks. However, because of the large inertia of the spindle motor, the normal read or access time for reproducing the stored data increases when the spindle motor changes the rotational speed of the disk.

CD-ROM drives do not determine the address of a sector until sector address data is reproduced from the subcode portion of the sector. When a specified sector is to be reproduced, the optical pick-unit of the CD-ROM drive accesses a pseudo-random portion of the disk which is likely to include the specified sector, and the accessed sector address is identified in the reproduced subcode. The drive then accesses another sector until the specified sector is reproduced. Since the optical pick-up unit in the drive reproduces pseudo-random locations during a seek operation, the rotational speed of the disk is constantly changing, thus reducing the access time. In conventional devices, the seek time to reproduce one-third of the storage locations of a disk is approximately 200 microseconds, and since the power dissipation is 2 to 3 watts when the rotational velocity changes, such CD-ROM drives are not well-suited for systems having low power requirements, e.g., notebook or other portable-type computers. Nonetheless, CD-ROMs are popular due to their large storage capacities, fast access time and portability with respect to the storage capacity of floppy diskettes and the access time of magnetic tapes. However, since CD-ROMs are read-only type memory devices, there is a need to have a read/write type storage device which has a large storage capacity, a fast access time, and which is portable, and although magnetic tapes have storage capacities from 10 megabytes to several tens of gigabytes, their access speed is relatively slow, and thus, they are used primarily as backup storage for the contents of hard disks.

A writable compact disk, known as a write once compact disk (CD-WO), has been developed which has a format similar to the CD-ROM but which can be written onto only once. In addition, since the CD-WO is a constant linear velocity (CLV) type storage medium, it has the same problems as those of the CD-ROM previously discussed.

OBJECTS OF THE INVENTION

Therefore, it is an object of the present invention to provide a constant angular velocity (CAV) read/write type disk storage medium which overcomes the shortcomings of the above described storage mediums.

A further object of the present invention is to provide apparatus for recording and reproducing data to and from a disk storage medium which overcomes the shortcomings of the above described devices.

An additional object of this invention is to reduce the access time by reproducing data from a CLV-type disk storage medium that is driven at a constant angular velocity (CAV).

Still another object of the present invention is to provide a technique for maintaining a constant angular velocity (CAV) of a disk storage medium.

A still further object of this invention is to provide apparatus for recording and reproducing data to and from a CAV-type disk storage medium.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, a disk storage medium (e.g., a magneto-optical compact disk, or CD-MO) comprises data areas (e.g., concentric circular zones) which have data stored at respectively different clock rates therein, and address areas associated with corresponding data areas which have address data (e.g., which identify the zone) stored at the same constant clock rate therein.

As one aspect of the present invention, the address data in each address area is stored in a pre-pit format and the data in each data area is stored in a magneto-optical format.

In accordance with another embodiment of the present invention, apparatus and method for reproducing data from a disk storage medium (e.g., a CD-ROM) which has data already stored thereon (e.g., at a constant linear data rate), operates to rotate the disk storage medium at a constant rotational velocity, reproduce data stored on the disk storage medium, measure a sync signal (e.g., a frame synchronizing signal) contained in the reproduced data (e.g., which identifies the clock rate or bit frequency of the reproduced data), and decode (e.g., demodulate) the reproduced data in accordance with the measured amount of reproduction time of the sync signal.

In accordance with a further embodiment of the present invention, apparatus and method for adjusting a rotational velocity of a disk storage medium (e.g., a CD-MO), operates to rotate the disk storage medium at a rotational velocity, reproduce address data stored in an address area on the disk storage medium, measure an amount of reproduction time for reproducing the address data, and adjust the rotational velocity of the disk storage medium in accordance with the measured amount such that the rotational velocity of the disk storage medium remains substantially constant.

As one aspect of the present invention, all address areas on the disk have substantially the same angular length and the amount of reproduction time for reproducing address data from each address area is substantially the same when the disk rotates at a substantially constant rotational velocity.

In accordance with another embodiment of the present invention, apparatus and method for recording data (e.g., at a constant rotational velocity) on a disk (e.g., a CD-MO) which has address data already stored thereon at a predetermined clock rate, operates to set a clock rate for data to be recorded in accordance with the position (e.g., the zone) on the disk at which the data is to be recorded, and record the (e.g., modulated) data on the disk at the set clock rate.

In accordance with another embodiment of the present invention, apparatus and method for reproducing data (e.g., at a constant rotational velocity) from a disk (e.g., a CD-MO) which has address data already stored thereon at a predetermined clock rate, operates to reproduce data from a data area on the disk, ascertain the clock rate of the reproduced data in accordance with the position (e.g., zone) on the disk from which the data was reproduced, and decode (e.g., demodulate) the reproduced data in accordance with the ascertained clock rate.

As an aspect of the above inventions, address data is reproduced from an address area which corresponds to the data area at which the data is to be recorded or from which the data is reproduced, and the clock rate of the data is set (during recording) or ascertained (during reproduction) in accordance with the zone identified in the reproduced address data.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

As previously discussed, a CD-ROM is a constant linear velocity (CLV) type optical disk which has spiral tracks of digital data recorded thereon; and digital data are recorded on the CD-ROM in the form of phase pits. A magneto-optical disk, known as "CD-MO", is a read/write type random access memory disk storage medium in which digital data may be recorded repeatedly thereon.

One type of CD-MO is a zone constant angular velocity type (Z-CAV-type) optical disk which has three concentric storage zones A, B and C on which digital data is recorded and from which the digital data is reproduced. The angular velocity (i.e., rotational velocity) of the Z-CAV CD-ROM is constant when recording or reproducing data from a respective zone, and is slowest during reproduction or recording at locations located in the outermost zone and is greatest during reproduction or recording at locations located in the innermost zone. Recorded tracks on the CD-MO are either spiral or concentric, but since an optical pick-up unit must jump to the original track in order to re-read data from that track when the stored data was not reproduced properly, concentric tracks are generally preferred.

Figure 1:
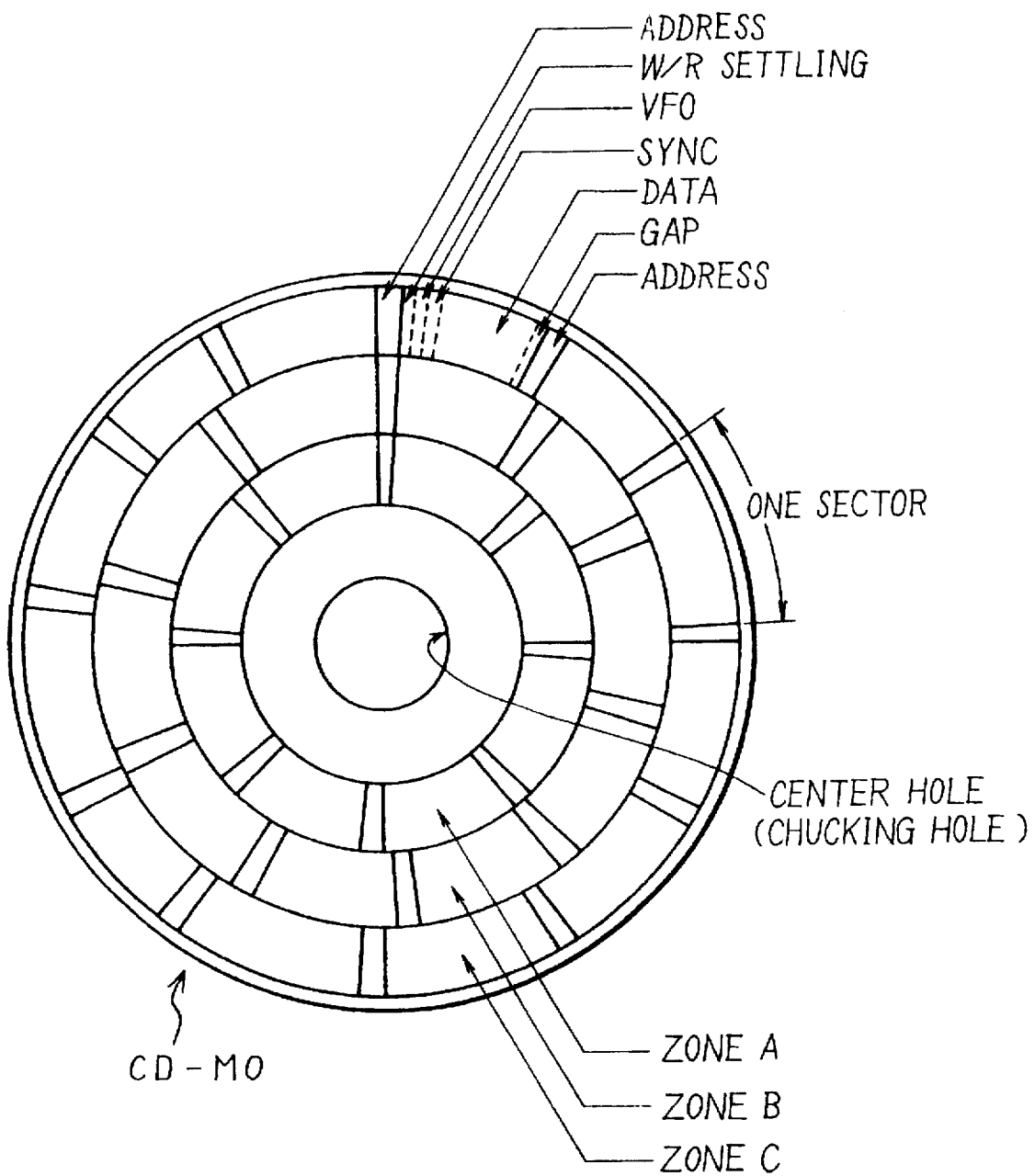
FIG. 1 is a schematic illustration of the format of a magneto optical type compact disk (CD-MO) in accordance with the present invention.

Referring now to the drawings, FIG. 1 is a schematic illustration of the format of a magneto optical type compact disk (CD-MO) in accordance with the present invention. As shown, the CD-MO is divided into three zones, A, B and C, each zone including a number of sectors. Each sector includes an address area, a W/R settling area, a VFO area, a sync area, a data area and a gap (further described below). The diameter of the CD-MO is generally, for example, 12 cm, 8 cm, or 86 mm to 95 mm, all of which fit into a 3.5 inch disk drive. The CD-MO has a chucking hole at its center which is the same size as that of CD-ROM. In accordance with the present invention, the CD-MO is rotated at the constant angular velocity (CAV) of 535 rpm during recording and reproduction of all of the locations on the disk, which is the same velocity at which a CD-ROM is rotated during reproduction of its innermost areas.

Figure 2:
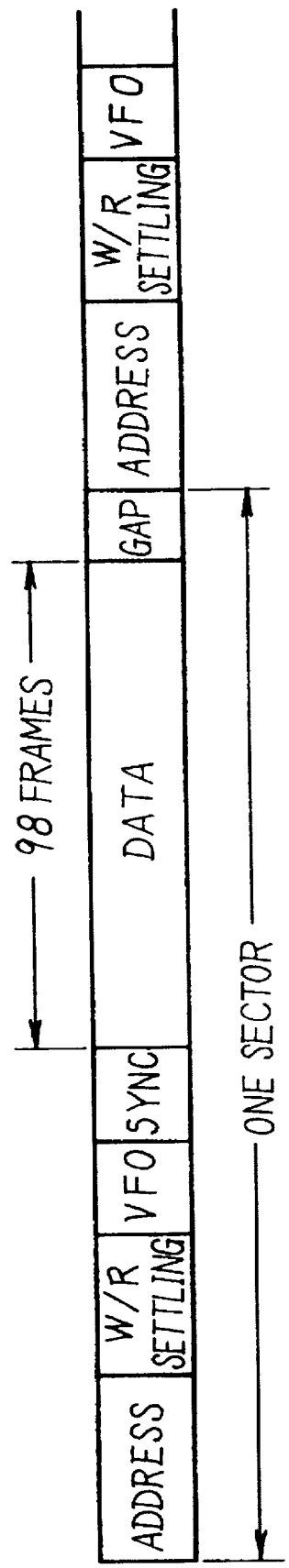
FIG. 2 is a schematic illustration of the data format of a sector on the CD-MO.

FIG. 2 is a schematic illustration of the data format of a sector on the CD-MO. Each sector includes an address area which contains address data which identifies the sector's address; a W/R (write/read) settling area which is utilized for adjusting the light-emitting power of a laser diode of an optical pick-unit in the disk drive; a VFO area which is used for locking the variable frequency oscillator (VFO) (i.e., phase lock loop (PLL)) and for achieving efficient operation of the extracting circuit in the disk drive by utilizing various characteristics of "DC free" code in the EFM modulation process (e.g., a code which is "DC free" and "out of rule" in EFM is a repetitively recorded (e.g., 2 or 3 times) synchronization pattern); a sync area which indicates the beginning of the data area; and a data area which stores 98 frames of data. A gap area exists at the end of each sector in order to prevent failures due to misalignment of the optical disk or an incorrect rotation speed of the disk.

Figure 3:
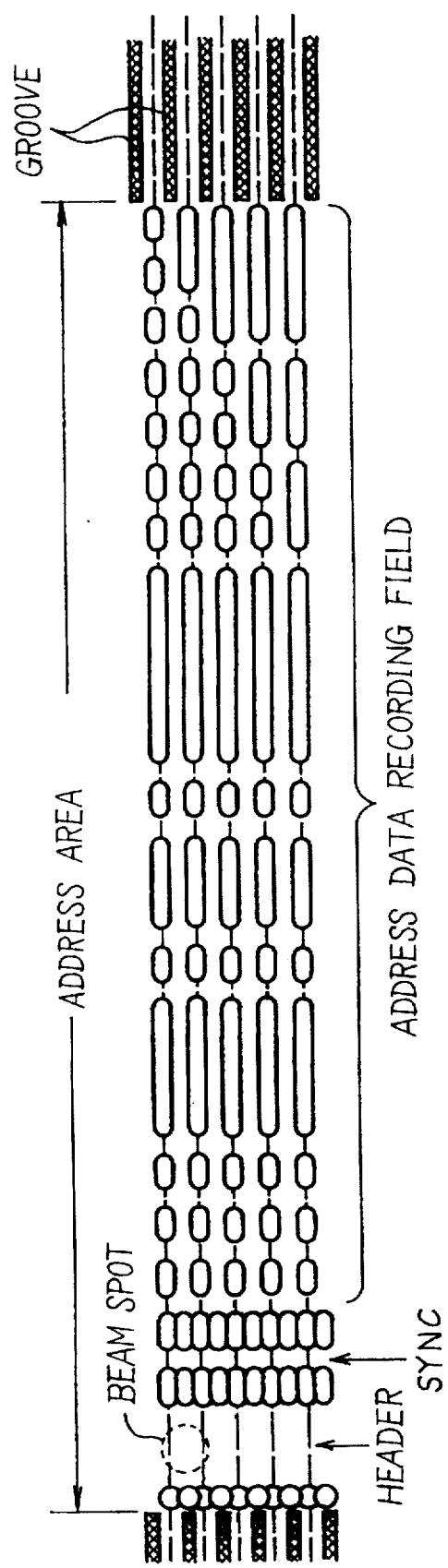
FIG. 3 is a schematic diagram of an address area on the CD-MO.

FIG. 3 is a schematic diagram of an address area on the CD-MO in accordance with the present invention. Address data are recorded in advance by pre-pits (phase-pits) which are formed by an emboss process, and are stored in the form of, for example, a low density Gray code which is stored two or three times with an error correction code. The data in the address area of each sector are not overwritten during a recording process, and thus, only the data in the data areas may be overwritten. As shown, each address area includes a header (i.e., the wide mirror portion) which cancels a tracking error signal offset, followed by a sync mark (i.e., the narrow mirror portion) which indicates the beginning of an address data recording field, and the address data recording field which contains the address data. A groove follows each address area. The address data in all of the address areas on the CD-MO is stored at a constant clock rate, the constant rate being the same clock rate for each track in each zone and for all zones. In accordance with a preferred embodiment of the present invention, the angular length of every address area on the CD-MO is the same. Hence, the amount of time needed to reproduce the address data from the address area, that is, the amount of reproduction time, of every address area (in all three zones) on the CD-MO is the same since the CD-MO is rotating at a constant angular velocity. In addition, since the address data in the address area of each sector is stored at a constant clock rate, the address data may be reproduced and easily decoded (i.e., demodulated) at a known clock rate, which is in contrast to the data stored in the data area (to be discussed).

Figure 4:
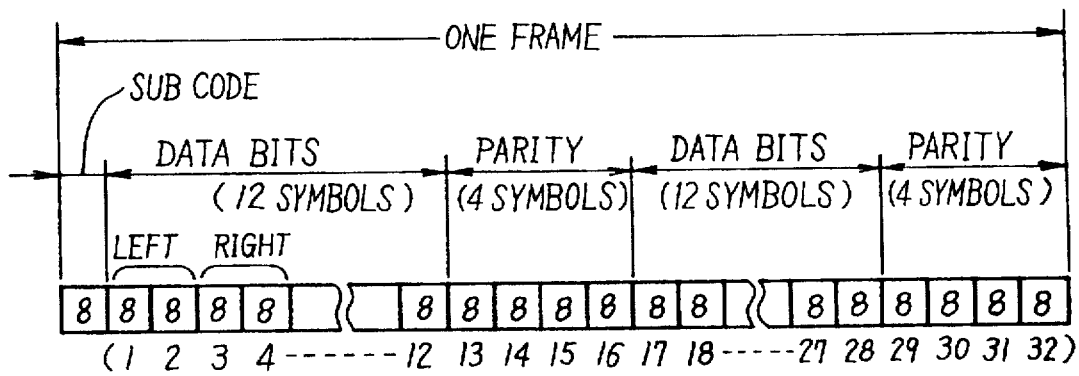
FIG. 4 is a schematic diagram of the format of one frame of data on the CD-MO.

FIG. 4 illustrates the data structure of one frame of data in each sector on the CD-MO. It is to be noted that the data area of the CD-MO has the same data structure as that of CD-ROM. As shown, one frame is comprised of 8 bits of subcode data followed by 12 8-bit symbols of data, 4 8-bit symbols of parity code, another 12 8-bit symbols of data and another 4 8-bit symbols of parity code. Therefore, each frame consists of one symbol of subcode, 24 symbols of data which may be audio data or digital data, and 8 symbols of parity data, and each frame additionally includes 24 channel bits which are used for frame synchronization (i.e., sync data) and a margin bit for suppressing direct currents (not shown in FIG. 4). A symbol consists of 8 bits which is converted into 14 channel bits when EFM modulated, and thus, one frame is comprised of 588 channel bits.

Figure 5:
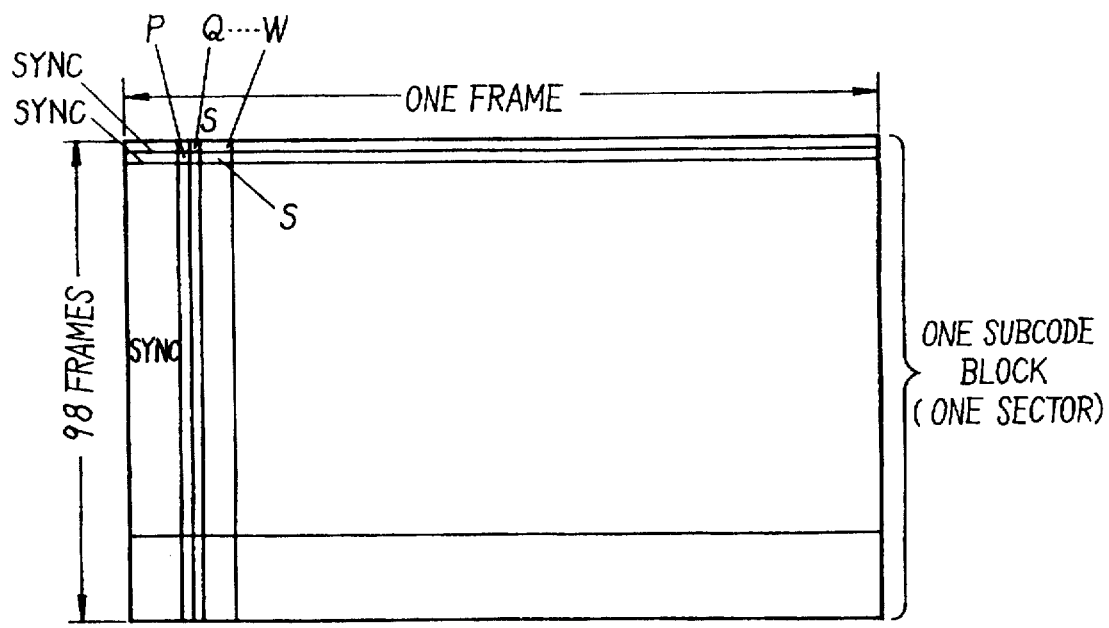
FIG. 5 is another schematic illustration of the data format of a sector on the CD-MO.

FIG. 5 illustrates the data structure of a subcode block in each sector on the CD-MO. As shown, one subcode block is comprised of 98 frames, and each frame includes synchronization data (SYNC) followed by 8 channel subcode bits P to W (channel P to channel W). Channel P is generally used as a flag which indicates the type of head, and channel Q in each frame may be used as a control bit (e.g., data/audio flag, address, track number, time code, etc). Two codes which are "out of rule" in EFM modulation are used as frame sync codes S0 and S1.

Figure 6:
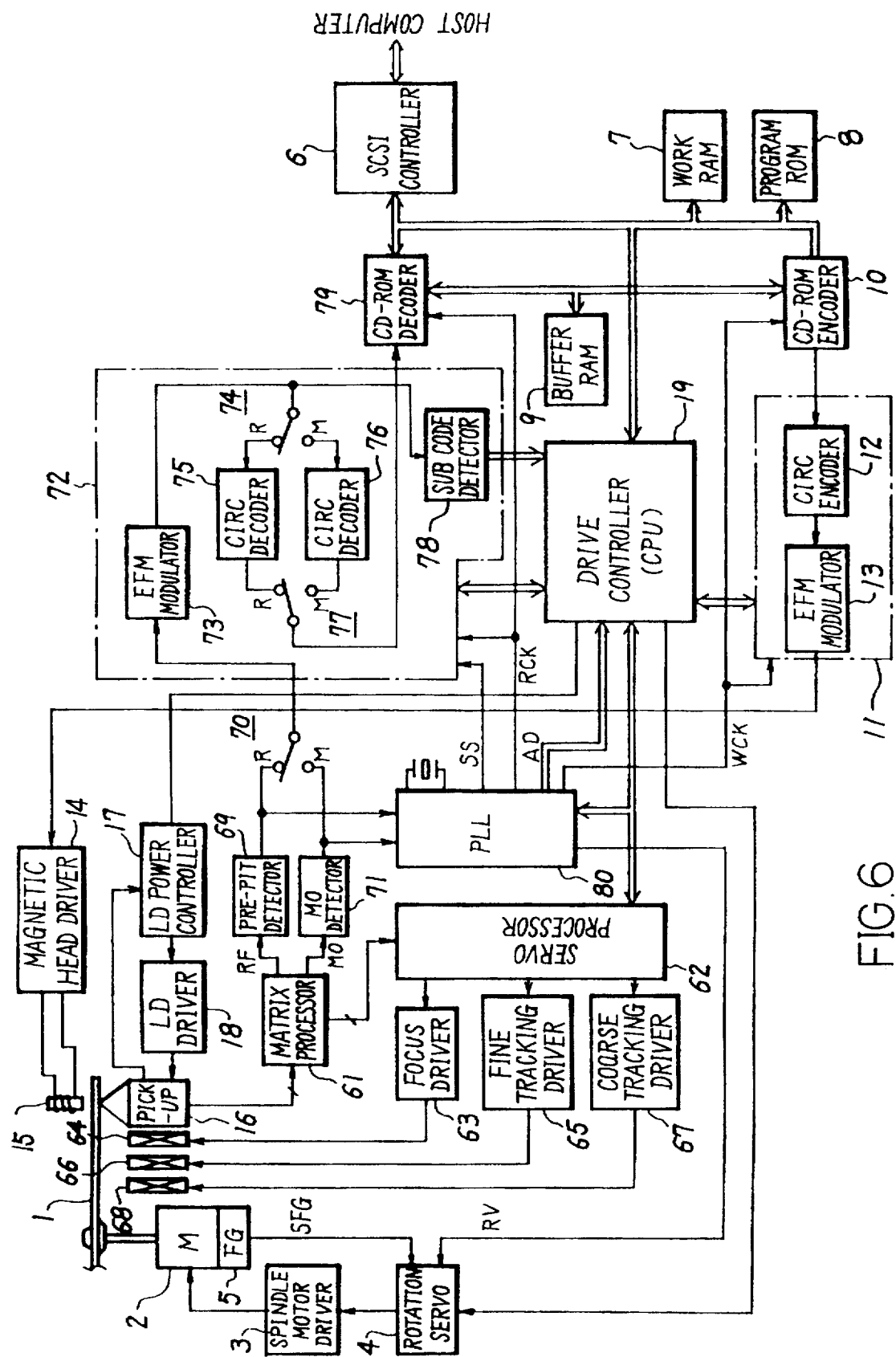
FIG. 6 is a block diagram of a disk drive in accordance with the present invention.

FIG. 6 is a block diagram of apparatus (e.g., a disk drive) for recording and reproducing data to and from a disk storage medium in accordance with the present invention. A CD-ROM or CD-MO (disk 1) is installed in the disk drive of the present invention whose disk rotation circuit is comprised of a motor 2, a motor drive 3, a rotation servo 4 and a frequency generator (FG) 5. Disk 1 is rotated by spindle motor 2 which is driven by spindle motor drive 3 in response to a control signal supplied by rotation servo 4. Frequency generator 5 is mounted on the rotation shaft of motor 2 and provides a frequency signal SFG, which corresponds to the rotational velocity of motor 2, to rotation servo 4.

During a recording operation, data to be recorded is supplied to an encoder 10 from a host computer (not shown) via an SCSI controller 6 and a work RAM 7 in accordance with a program in a program ROM 8. Encoder 10 scrambles and corrects the data by a layered ECC process using Reed-Solomon code, and supplies the encoded data to a CIRC encoder 12 in a recorded signal processing circuit 11 which corrects errors in the data by error correcting coding which utilizes cross interleaved Reed-Solomon coding (CIRC). When the data is interleaved by CIRC, known as the first interleaving process, interleaving is performed for a maximum of 108 frames and convoluted with the other sequential frames (further described below). On the other hand, encoder 12 may perform a second form of interleaving (second interleaving process) by CIRC for a maximum interleaving of 95 frames, and the data is interleaved on a 98-frame cycle with modulo 98, thus having the error correcting coding be complete in one sector having 98 frames (further described below).

Encoder 12 supplies the encoded data to an EFM modulator 13 which performs eight-to-fourteen modulation (EFM) of the encoded data and supplies the modulated data to a magnetic head driver 14 and a magnetic head 15 that generates an external field which corresponds to the modulated data (and which includes the subcode and frame synchronizing signal) and optically records the data on the CD-MO 1 with the aid of a laser beam in an optical pick-up unit 16.

Figure 7:
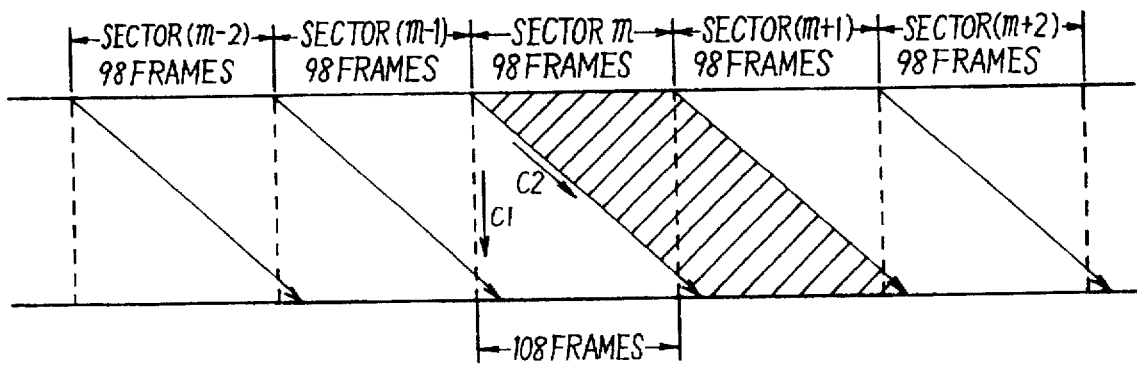
FIG. 7 is helpful in understanding the operation of a first interleaving process.
Figure 8:
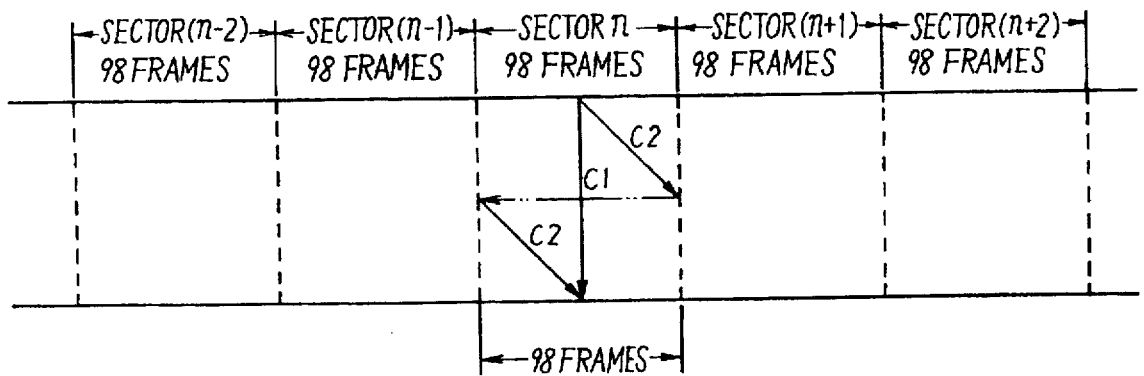
FIG. 8 is helpful in understanding the operation of a second interleaving process.

When data to be recorded is initially received, it is arranged two-dimensionally and Q-parity bits are added to the data by applying the Reed-Solomon code (28, 24, 5), thus producing coding lines C2. The data is then interleaved before P-parity bits are added, thus producing lines C1. The first and second interleaving (i.e., encoding) processes and deinterleaving (i.e., decoding) processes will be briefly described with reference to FIGS. 7-12. FIG. 7 illustrates the first interleaving process in which a maximum of 108 frames are interleaved and coded by convoluting the data with data in the subsequent frame. For example, data from sector "m", which corresponds to the shaded area, when rewritten influences all C1 lines in sector m+1 and some C1 lines in sector M+2, and thus, the parity bits in sector m+1 and m+2 are regenerated and rewritten. FIG. 8 illustrates the second interleaving process in which a maximum of 95 frames are interleaved in cycles of modulo 98, and since error correction coding is performed within one sector, data in a sector "n" may be rewritten without affecting adjacent sectors n−1 and n+1.

Figure 9:
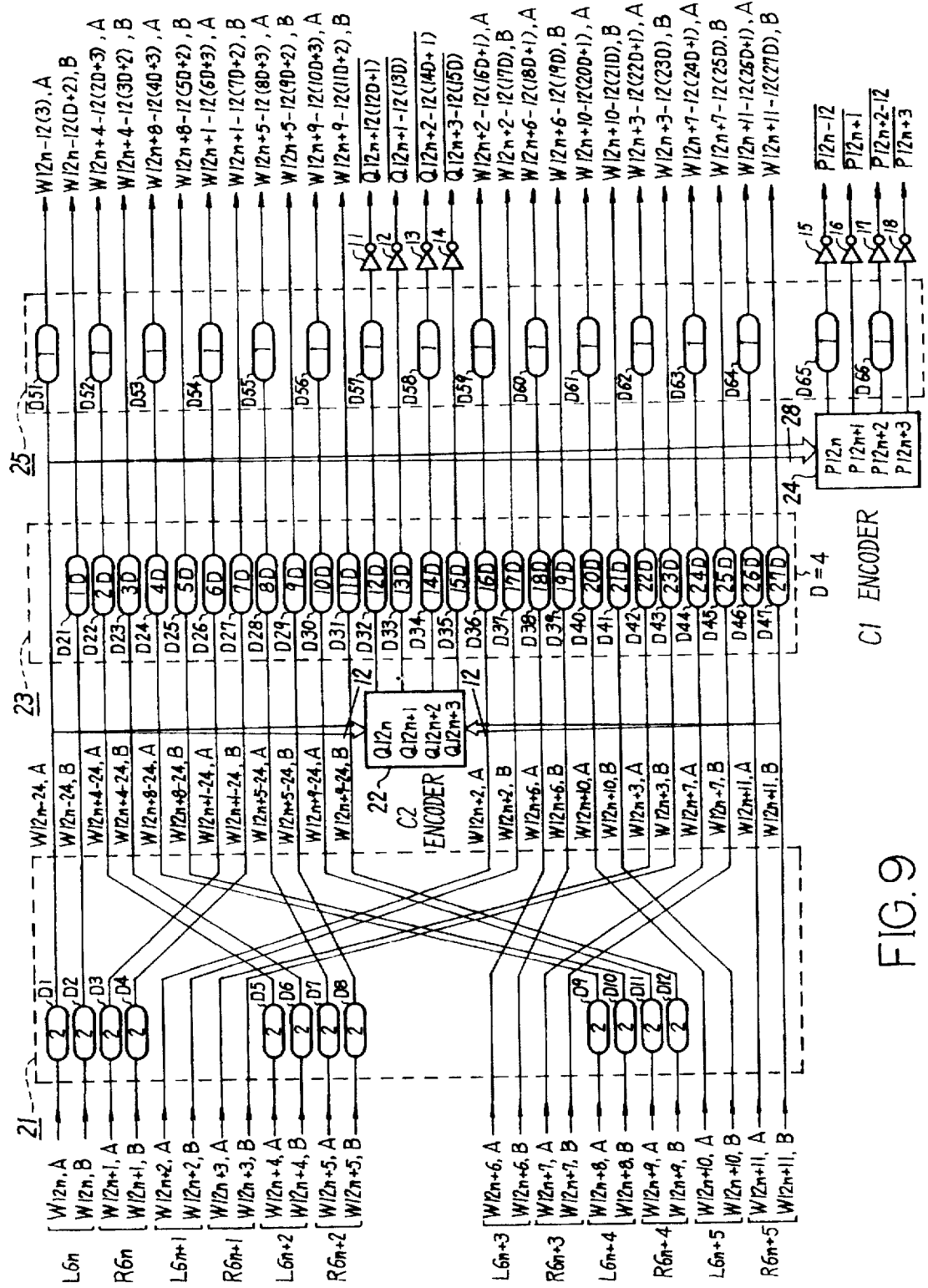
FIG. 9 is a data flow diagram illustrating an encoding process utilizing the first interleaving process.

FIG. 9 illustrates the encoding process using the first interleaving process. As shown, 12 units of data L6n, R6n, L6n+1, R6n+1, ... L6n+5 and R6n+5 to be recorded, each unit consisting of 16 bits, are each divided into two components of 8 bits each, resulting in the 24 data components (W12n,A), (W12n,B), (W12n+1,A), (W12n+1,B), (W12n+2,A), (W12n+2,B) ... (W12n+11,A), and (W12n+11,B), in which the "A" components contain the first 8 bits of data and the "B" components contains the second 8 bits of data. The 24 data components are supplied to a delay block 21 which delays data in the even numbered R and L units (i.e., (W12n,A), (W12n,B), (W12n+1,A), (W12n+1,B), (W12n+4,A), (W12n+4,B), (W12n+5,A), (W12n+5,B), (W12n+8,A), (W12n+8,B), (W12n+9,A), (W12n+9,B)) by two frames in delay elements D1 to D12, respectively. Delay block 21 rearranges (scrambles) the data in the manner illustrated and supplies the data as 24 symbols of data to a C2 encoder 22 which generates 4 Q-parity symbols Q12n, Q12n+1, Q12n+2 and Q12n+3 with the Reed-Solomon code (28, 24, 5). C2 encoder 22 supplies the 4 Q-parity symbols with the 24 symbols of data to a delay block 23 which interleaves the 28 symbols for a multiple of four frames in delay elements D21 to D47. Delay block 23 supplies the 28 interleaved symbols to a C1 encoder 24 which generates 4 P-parity symbols P12n, P12n+1, P12n+2 and P12n+3 with the Reed-Solomon code (32, 28, 5). C1 encoder 24 supplies the 4 P-parity symbols P12n to P12n+3 with the 28 interleaved symbols to a delay block 25 which delays every other symbol of the 32 symbols for one frame in delay elements D51 to D66, respectively, as shown. The 8 parity symbols are inverted by inverters I1 to I8, respectively, at which point, encoding by the first interleaving process is complete.

Figure 10:
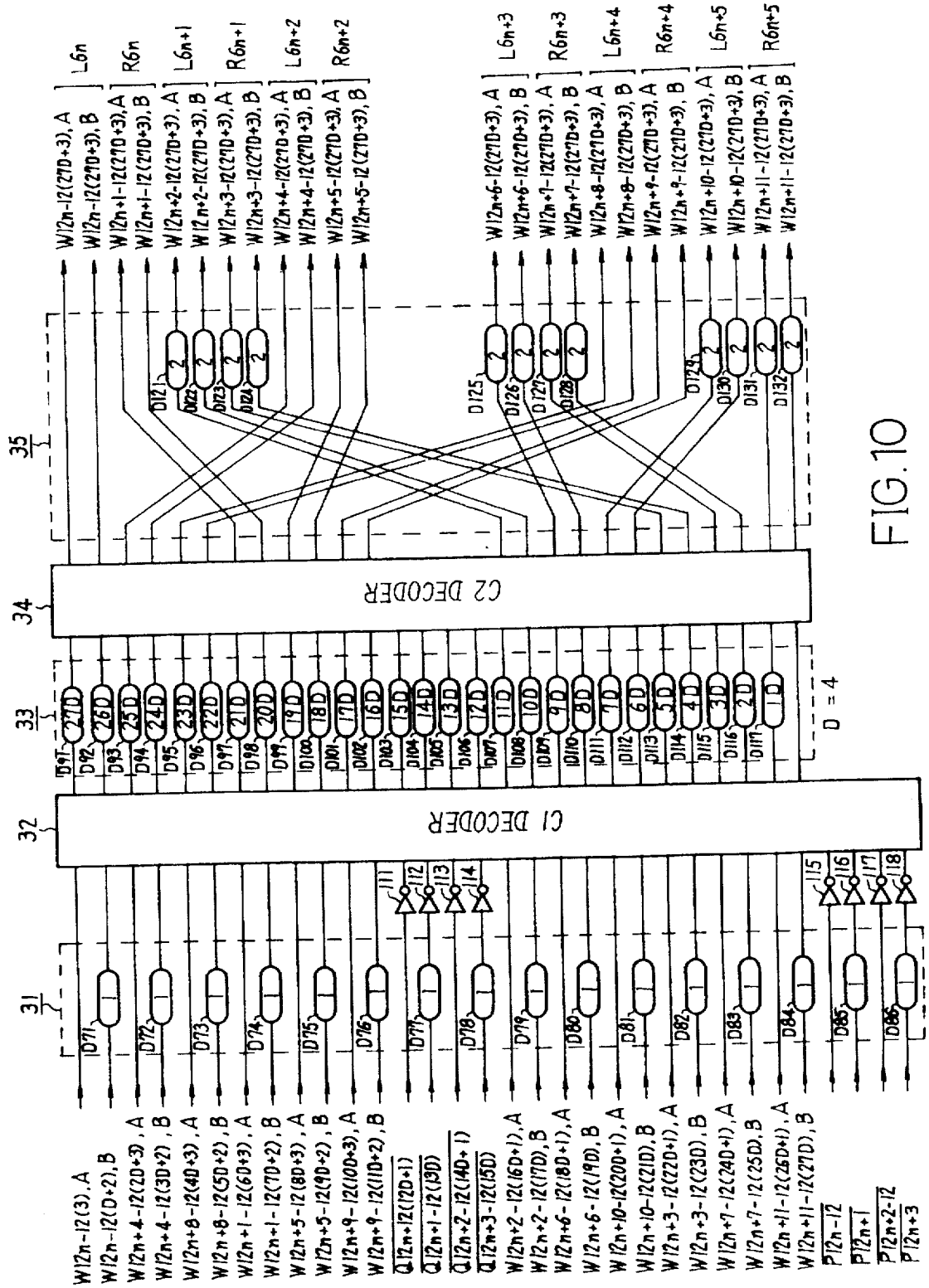
FIG. 10 is a data flow diagram illustrating a decoding process utilizing the first interleaving process.

Decoding reproduced data which was interleaved by the first interleaving process will now be described with reference to FIG. 10. 32 symbols are reproduced (24 symbols of data, 4 P-parity symbols, and 4 Q-parity symbols) and supplied to a delay block 31 which delays every other symbol (which had not been delayed in the encoding process) for one frame in delay elements D71 to D86, respectively. The 8 parity symbols are inverted by inverters I11 to I18, respectively. The 32 symbols are then supplied to a C1 decoder 32 which corrects errors in the symbols utilizing the 4 P-parity symbols and supplies the corrected symbols to a delay block 33 which de-interleaves the symbols for a multiple of four frames in delay elements D91 to D117, respectively. The de-interleaved symbols are supplied to a C2 decoder 34 which further corrects the symbols utilizing the 4 Q-parity symbols and supplies the symbols to a delay block 35 which rearranges the data in a time serial order and delays the R and L odd numbered symbols by two frames in delay elements D121 to D132 as shown, to produce decoded data.

Figure 11:
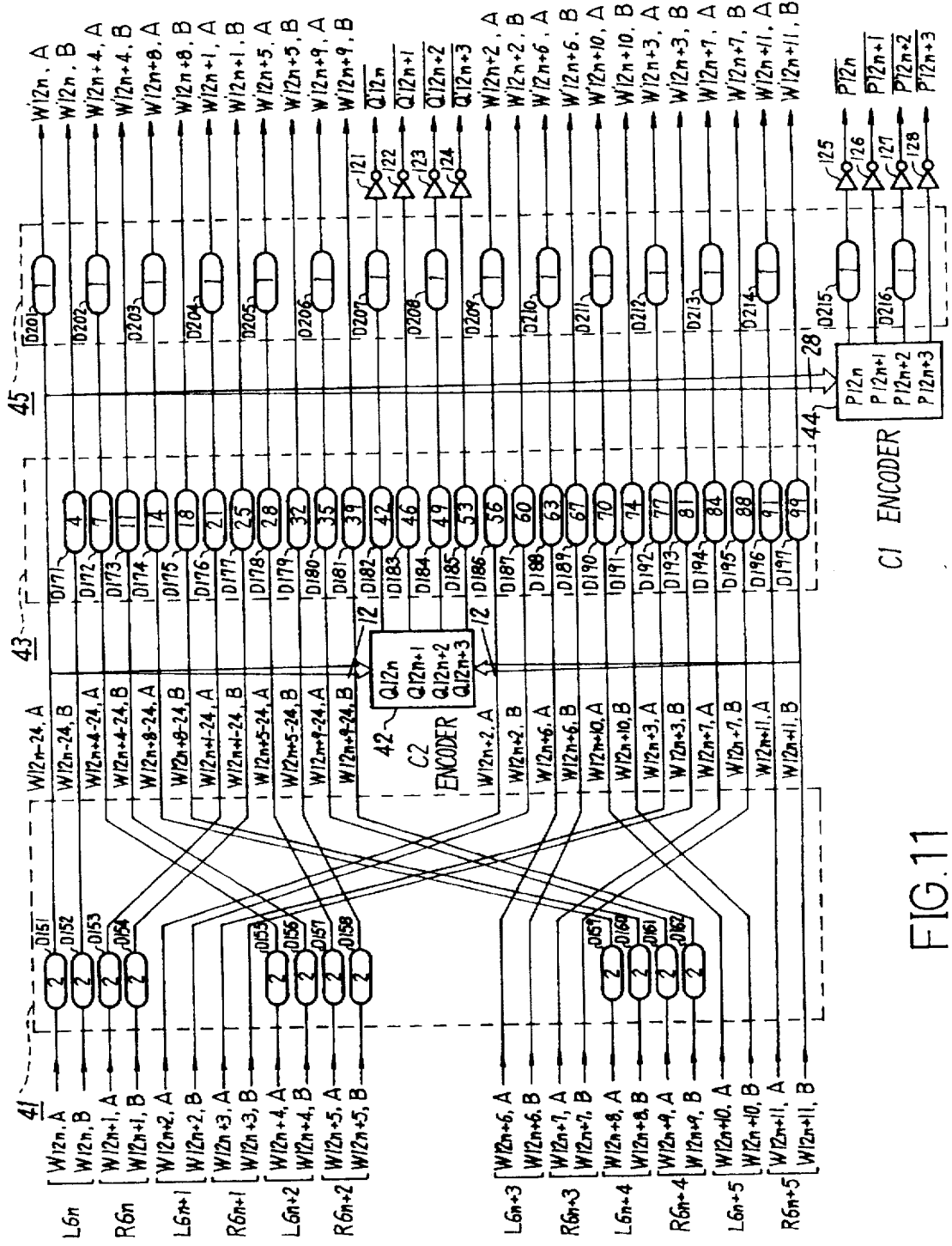
FIG. 11 is a data flow diagram illustrating an encoding process utilizing the second interleaving process.

The encoding process using the second interleaving process is described with reference to FIG. 11. As shown, 12 units of data L6n, R6n, L6n+1, R6n+1, ... L6n+5 and R6n+5 to be recorded are each divided into two components of 8 bits each, resulting in the 24 data components (W12n, A), (W12n,B) ... (W12n+11,A), and (W12n+11,B). The 24 components are supplied to a delay block 41 which delays data in the even numbered R and L units by two frames using cycles of modulo 98 in delay elements D151 to D162. Delay block 41 rearranges (scrambles) the data in the manner illustrated and supplies the data as 24 symbols of data to a C2 encoder 42 which generates 4 Q-parity symbols Q12n, Q12n+1, Q12n+2 and Q12n+3 with the Reed-Solomon code (28, 24, 5). C2 encoder 42 supplies the 4 Q-parity symbols with the 24 symbols of data to a delay block 43 which interleaves the 28 symbols for four frames, three frames, four frames, etc, in cycles of modulo 98 in delay elements D171 to D197. Delay block 43 supplies the 28 interleaved symbols to a C1 encoder 44 which generates 4 P-parity symbols P12n, P12n+1, P12n+2 and P12n+3 with the Reed-Solomon code (32, 28, 5). C1 encoder 44 supplies the 4 P-parity symbols P12n to P12n+3 with the 28 interleaved symbols to a delay block 45 which delays every other symbol for one frame in cycles of modulo 98 in delay elements D201 to D216, respectively, as shown. The 8 parity symbols are inverted by inverters I21 to I28, respectively, at which point, encoding by the second interleaving process is complete.

Figure 12:
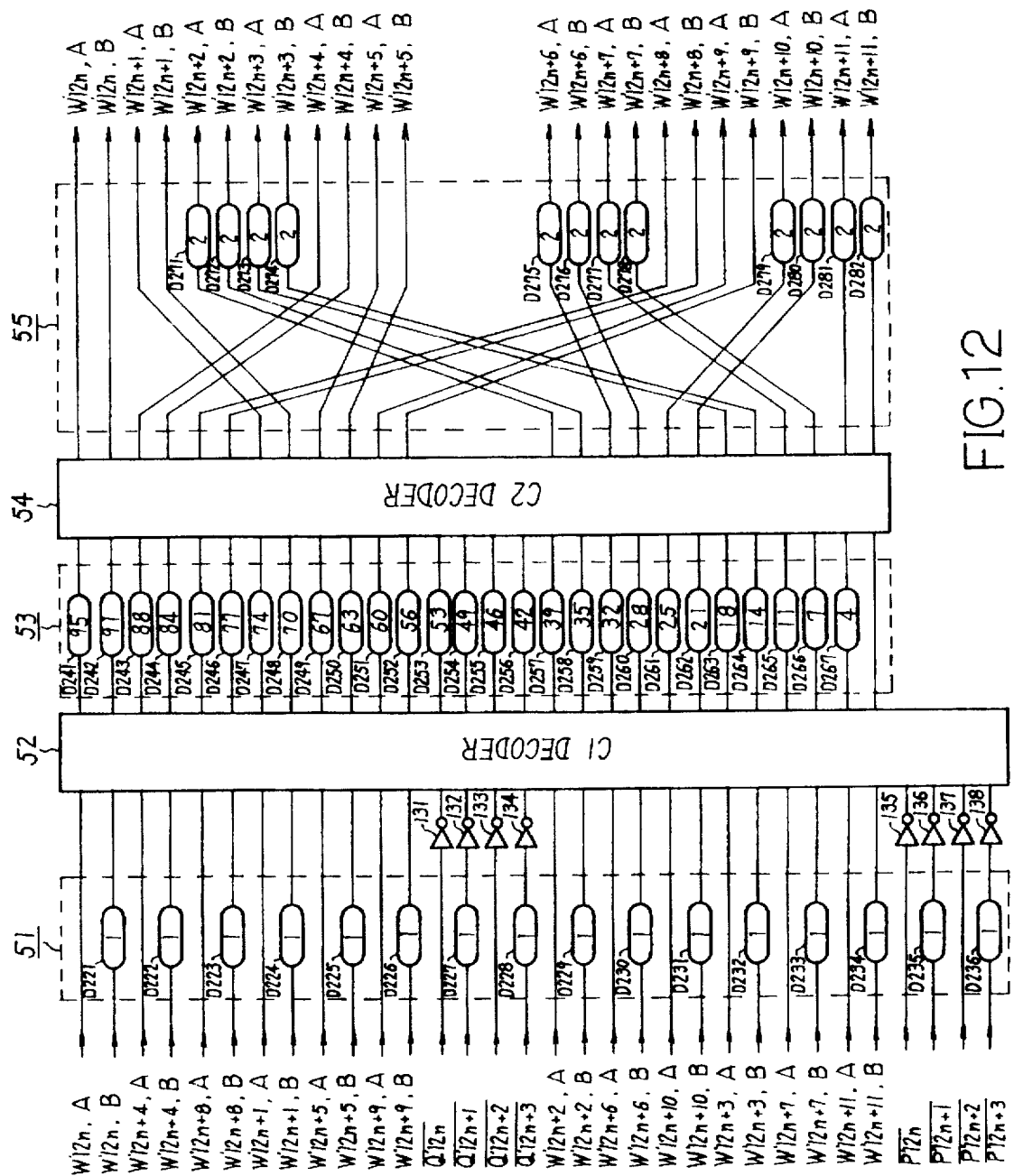
FIG. 12 is a data flow diagram illustrating a decoding process utilizing the second interleaving process.

Decoding reproduced data which was interleaved by the second interleaving process will now be described with reference to FIG. 12. 32 symbols are reproduced (24 symbols of data, 4 P-parity symbols, and 4 Q-parity symbols) and supplied to a delay block 51 which delays every other symbol (which had not been delayed in the encoding process) for one frame in cycles of modulo 98 in delay elements D221 to D236, respectively. The 8 parity symbols are inverted by inverters 131 to 138, respectively. The 32 symbols are then supplied to a C1 decoder 52 which corrects errors in the symbols utilizing the 4 P-parity symbols and supplies the corrected symbols to a delay block 53 which de-interleaves the symbols for four frames, three frames, four frames, etc, using cycles of modulo 98 in delay elements D241 to D267. The de-interleaved symbols are supplied to a C2 decoder 54 which further corrects the symbols utilizing the 4 Q-parity symbols and supplies the symbols to a delay block 55 which rearranges the data in a time serial order and delays the R and L odd numbered symbols by two frames using cycles of modulo 98 in delay elements D271 to D282, respectively, as shown, to produce decoded data.

The encoding and decoding processes by the first and second interleaving processes are disclosed in Japanese Patent Application No. 118567/88 (Japanese Publication No. 287872/89). The first and second interleaving processes do not form any part of the present invention per se.

Referring back to FIG. 6, a signal representing the light-emitting power of the laser diode (not shown) mounted in optical pick-up unit 16 is supplied to a power controller 17 which controls a laser diode driver 18 in order to stabilize the light-emitting power of the laser diode. The light-emitting power is adjusted at the time of recording or reproducing in response to a control signal from a drive controller 19 (e.g., a CPU).

Optical detectors in optical pick-up unit 16 supply signals to a matrix processor 61 which performs add/subtract operations on the signals and generates a focus error signal and a tracking error signal. The tracking error signal is generated by the reproduction of pre-pits formed on a reproduced CD-ROM, or by the grooves formed on both sides of the reproduced tracks on the CD-MO. The tracking error signal and focus error signal are supplied to a servo processor 62 which adjusts the polarity of the tracking error signal in accordance with the type of CD being reproduced since the tracking error signal for CD-ROM is opposite in polarity from the tracking error signal for CD-MO. In addition, since the tracking error signal is of opposite polarity in the address area where the pre-pits are formed on a CD-MO, servo processor 62 is able to adjust its polarity. Servo processor 62 supplies a drive signal to a focus driver 63 which provides servo control of a focus coil 64, and supplies a drive signal to a fine tracking driver 65 which provides servo control of a fine tracking coil 66. Seek control is accomplished in servo processor 62, based on address data extracted from the subcode area of a reproduced CD-ROM or based on address data extracted from the address area of a reproduced CD-MO, by supplying a drive signal to a coarse tracking driver 67 which provides servo control of a coarse tracking coil 68.

In accordance with the present invention, matrix processor 61 provides an RF signal which corresponds to the amount of reflection of a reflecting beam from disk 1 to a pre-pit detector 69 which detects recorded data in the RF signal, waveform equalizes the recorded data, and supplies the equalized data to a terminal R of a switch 70. Matrix processor 61 also provides an MO signal which corresponds to the rotation of the polarization aspect in a beam reflected from disk 1 to a MO detector 71 which detects recorded data in the MO signal, waveform equalizes the recorded MO data, and supplies the equalized MO data to a terminal M of switch 70. Switch 70 is switched to terminal R when disk 1 is a CD-ROM and is switched to terminal M when disk 1 is a CD-MO. The data output from switch 70 is supplied to an EFM demodulator 73 in a reproduced signal processing circuit 72 which performs EFM demodulation of the data and supplies the demodulated data to either CIRC decoder 75 or 76 via a switch 74. EFM demodulator 73 also supplies the demodulated data to a subcode detector 78 (further discussed below). Switch 74 is switched to terminal R when disk 1 is a CD-ROM and is switched to terminal M when disk 1 is a CD-MO.

CIRC decoders 75 and 76 decode the reproduced data using the first and second interleaving processes, respectively, as previously discussed. The decoded data is supplied to a CD-ROM decoder 79 via a switch 77 which is switched to terminal R when disk 1 is a CD-ROM and is switched to terminal M when disk 1 is a CD-MO. CD-ROM decoder 79 decodes the data in an inverse manner as that performed by CD-ROM encoder 10 utilizing a buffer RAM 9, and supplies the decoded digital signal to the host computer via SCSI controller 6.

As previously mentioned, EFM demodulator 73 supplies the demodulated data to subcode detector 78. A subcode in the data is detected in subcode detector 78 and the detected subcode is supplied to controller 19 which extracts the address data which is then used for seek control, previously discussed.

Pre-pit detector 69 and MO detector 71 also supply the reproduced data and reproduced MO data, respectively, to a PLL circuit 80 which generates read-clock pulses RCK when stored data is reproduced from either a CD-ROM or a CD-MO, and which generates write-clock pulses WCK when data is being stored on a CD-MO. Read-clock pulses RCK are utilized in reproduced signal processing circuit 72 and CD-ROM decoder 79 in order to decode and demodulate the reproduced signal and write-clock pulses WCK are utilized in recorded signal processing circuit 11 and CD-ROM encoder 10 in order to encode and modulate the signal prior to recording (further discussed below).

When disk 1 is a CD-MO, PLL circuit 80 further extracts address data AD from the reproduced address area of the CD-MO and supplies the address data AD to controller 19. PLL circuit 80 also generates from the reproduced data a rotation velocity variation voltage signal RV which corresponds to the rotational velocity of CD-MO 1 at the time the data is reproduced, and supplies signal RV to rotation servo 4 in order to control the rotational velocity of CD-MO 1. A sector synchronizing signal SS is also generated and supplied to reproduced signal processing circuit 72.

When disk 1 is a CD-ROM, frequency generator 5 supplies frequency signal SFG to rotation servo 4 to control the rotational velocity of CD-ROM 1, as previously described.

Rotation servo 4 utilizes either signal RV or signal SFG to control the rotation speed of disk 1 in response to whether a CD-ROM is being reproduced or whether a CD-MO is being reproduced or recorded, as indicated by a control signal supplied by controller 19.

Figure 13:
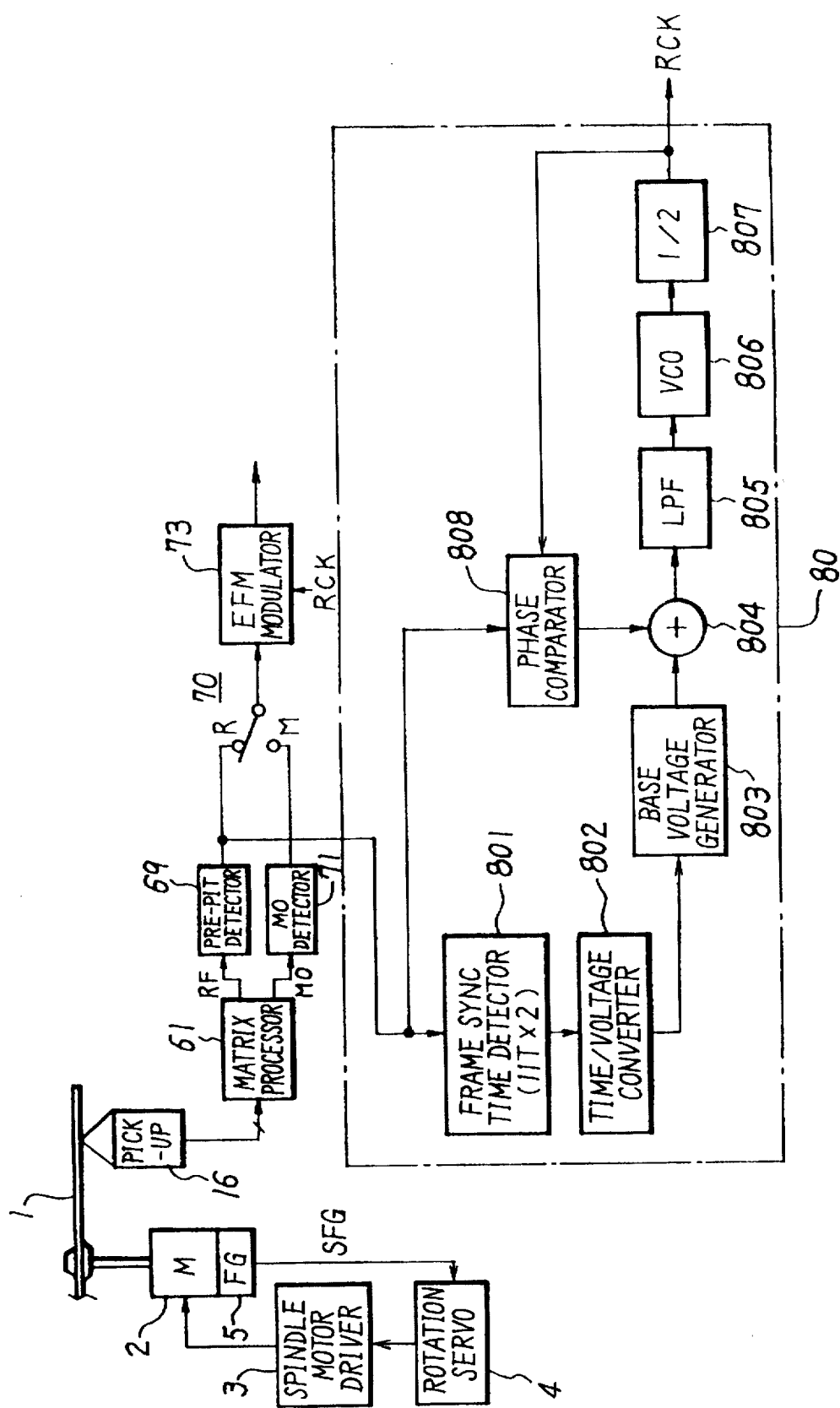
FIG. 13 is a block diagram of the disk drive reproducing circuit in accordance with the present invention.

The operation of reproducing data stored on a CD-ROM is further described with reference to FIG. 13. In accordance with the present invention, during reproduction of a CD-ROM which contains digital data stored thereon at a constant linear velocity (CLV), the CD-ROM is rotated at a constant angular velocity (CAV) when digital data is reproduced from one of its concentric tracks. Since CD-ROM is a CLV-type storage medium, the data rate of the reproduced signal is dependent upon the location of the track from which the data is reproduced. The data rate is determined in PLL circuit 80 which measures a specific pattern of the reproduced synchronizing signal, and the reproduced signal is decoded (i.e., demodulated) at this data rate. Since the CD-ROM is described herein as being rotated at a constant angular velocity during reproduction, access time is not increased and power dissipation is not increased due to continuous changes in the rotation of the motor.

As previously described, when a CD-ROM is reproduced, rotation servo 4 controls the rotational velocity of motor 2 via motor driver 3 in response to frequency signal SFG which is supplied from frequency generator 5, thereby causing the constant angular velocity (CAV) of CD-ROM 1.

Optical pick-up unit 16 reproduces the data stored on CD-ROM 1 and supplies the reproduced signal to matrix processor 61 which provides an RF signal to pre-pit detector 69. Pre-pit detector 69 detects the recorded data in the RF signal, and supplies a waveform equalized signal to EFM demodulator 73 via switch 70 (previously described) and to PLL circuit 80. A frame synchronizing time detector 801 in PLL circuit 80 to which the signal is supplied measures the pattern time of "11T×2" of the frame synchronizing signal in the reproduced signal, T being the bit cycle of the EFM signal. Since CD-ROM 1 is rotated at a constant angular velocity during reproduction, the amount of time necessary to reproduce the frame sync signal corresponds to the rate at which the data was stored at the reproduced location of CD-ROM 1. Frame sync time detector 801 supplies the measured pattern time to a time/voltage converter 802 which converts the pattern time to a voltage level and supplies the voltage level to a base voltage generator 803. A base voltage is generated in base voltage generator 803 which corresponds to the 11T×2 pattern time of the frame synchronizing signal and which also corresponds to the position on CD-ROM 1 from which the data was reproduced. The base voltage is supplied to a voltage control oscillator (VCO) 806 via an adder 804 and a low pass filter (LPF) 805, and the VCO produces an oscillating signal. VCO 806 supplies the oscillating signal to a divider 807 which divides the oscillating frequency in half to produce the read clock pulses RCK which are equal to the bit frequency of the data detected in pre-pit detector 69.

Read clock pulses RCK are supplied to a phase comparator 808 which compares the phase of the signal supplied by pre-pit detector 69 with the phase of read clock pulses RCK to produce a phase correction signal. The phase correction signal is supplied to adder 804 which corrects the phase of the base voltage signal supplied by base voltage generator 803. Therefore, PLL circuit 80 produces read clock pulses RCK which have a frequency and phase which correspond to the frequency and phase of the detected data supplied by pre-pit detector 69. Then, and in accordance with the present invention, read clock pulses RCK are supplied to EFM demodulator 73 which demodulates the reproduced data at the frequency and phase of read clock pulses RCK.

Figure 14:
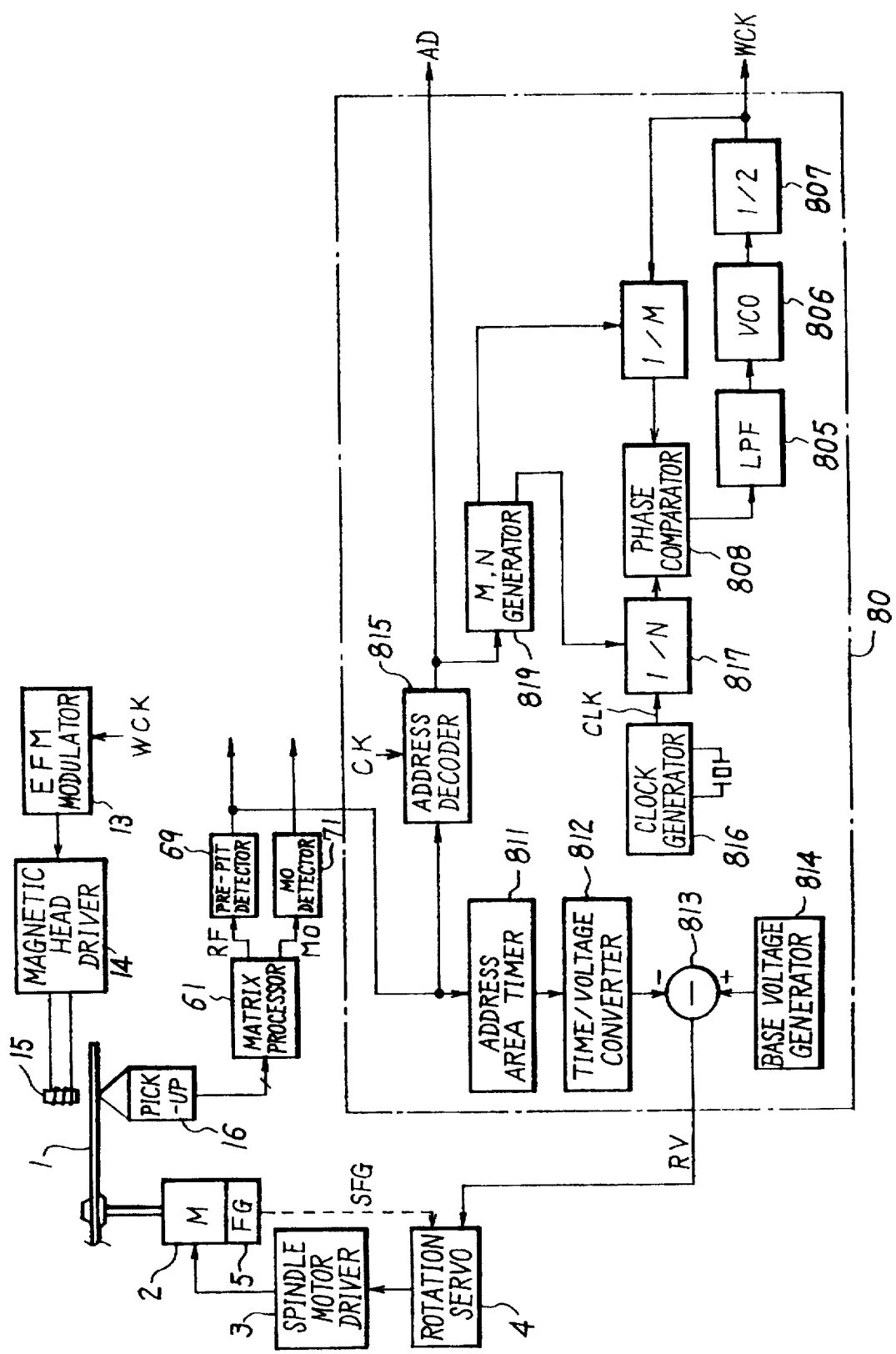
FIG. 14 is a block diagram of the disk drive recording and reproducing circuit in accordance with the present invention.

The operations of recording data on a CD-MO and rotating the CD-MO at a constant angular velocity in accordance with the present invention are described with reference to FIG. 14. During a recording operation, the address area of a sector on the CD-MO at which data is to be recorded (in the data area of the sector) is reproduced by pick-up unit 16 which supplies the reproduced signal to matrix processor 61 which provides an RF signal to pre-pit detector 69. Pre-pit detector 69 detects the recorded address data in the RF signal, and supplies a waveform equalized signal to PLL circuit 80 which produces rotation velocity variation voltage signal RV, write-clock pulses WCK, and address data signal AD as described below.

During the recording operation, PLL circuit supplies signal RV, which corresponds to the rotational velocity of CD-MO 1 when the address data is reproduced, to rotation servo 4 which maintains the rotational velocity of CD-MO 1 at a constant angular speed. Pre-pit detector 69 supplies the waveform equalized signal to an address area timer 811 in PLL circuit 80 which measures the amount of reproduction time of the address area. As previously described, since the angular length of each address area on the CD-MO is the same, the amount of time for reproducing each address area (in all three zones) on the CD-MO is the same when the CD-MO is rotating at a constant angular velocity. Therefore, the amount of reproduction time identified in address area timer 811 corresponds to the angular velocity of the CD-MO. The identified time is supplied to a time/voltage converter 812 which converts the time to an "actual" voltage which is supplied to subtractor 813. Subtractor 813 also receives an "ideal" base voltage from a base voltage generator 814 which corresponds to the amount of reproduction time of the address area when the CD-MO is rotating at the desired "ideal" constant angular velocity. Subtractor 813 subtracts the "actual" voltage from the "ideal" base voltage to produce rotation velocity variation voltage signal RV which corresponds to the error in the rotational velocity and which is supplied to rotation servo 4 which corrects the rotational velocity of CD-MO.

In another embodiment of the present invention, the angular velocity of CD-MO is not controlled by the reproduced address data and PLL circuit 80, but instead, is controlled by frequency generator 5 in a manner similar to that described when reproducing a CD-ROM. However, since a frequency generator increases the overall size of the device, controlling the angular velocity in PLL circuit 80 is the preferred method.

Also during the recording operation, PLL circuit generates the write-clock pulses WCK which have a frequency and phase equal to data ultimately recorded on the CD-MO. Then, and in accordance with the present invention, write clock pulses WCK are supplied to EFM modulator 13 which modulates the unmodulated signal, supplied to recorded signal processing circuit 11 (FIG. 6) to be recorded, at the frequency and phase indicated in write clock pulses WCK. The modulated signal is magneto-optically recorded by magnetic head 15 onto the data area (FIG. 2) of the sector on CD-MO from which the address data was reproduced.

The generation of write clock pulses WCK in PLL circuit 80 will now be described also with reference to FIG. 14. Pre-pit detector 69 supplies the reproduced signal to an address decoder 815 in PLL circuit 80 which extracts the address data AD from the reproduced signal utilizing clock pulses CK (e.g., master clock pulses divided into one-third), and since address data AD stored in the address area of each sector is stored at a constant clock rate (CK), the address data is easily decoded before the actual location (i.e., address or zone) from which the address data was reproduced is determined. Address decoder 815 supplies address data AD to controller 19 (FIG. 6) and to an M/N generator 819 which generates values M and N which correspond to the zone in which the decoded address is located. M/N generator 819 supplies the values M and N to an 1/N divider 817 and an 1/M divider 818, respectively. Master clock pulses produced by a clock generator 816 are frequency divided by N by 1/N divider 817 and the resultant pulses are supplied to phase comparator 808. Phase comparator 808 compares the phase of the 1/N divided pulses with the phase of 1/M divided WCK pulses and supplies a phase compared deviation voltage signal to voltage control oscillator 806 via low pass filter 805. VCO 805 supplies an oscillating signal to frequency divider 807 which divides the signal frequency in half to produce write clock pulses WCK. Pulses WCK are fed-back to 1/M divider 818 which divides the frequency of the WCK pulses by M to produce the 1/M divided WCK pulses which are supplied to phase comparator 808. Accordingly, write clock pulses WCK correspond to the rate of data to be recorded in either zone A, B or C, and are also synchronized with master clock pulses CLK. Then, and as previously described, write clock pulses WCK are supplied to EFM modulator 13 which modulates the signal at the frequency and phase indicated in write clock pulses WCK before the signal is optically recorded onto the CD-MO.

Figure 15:
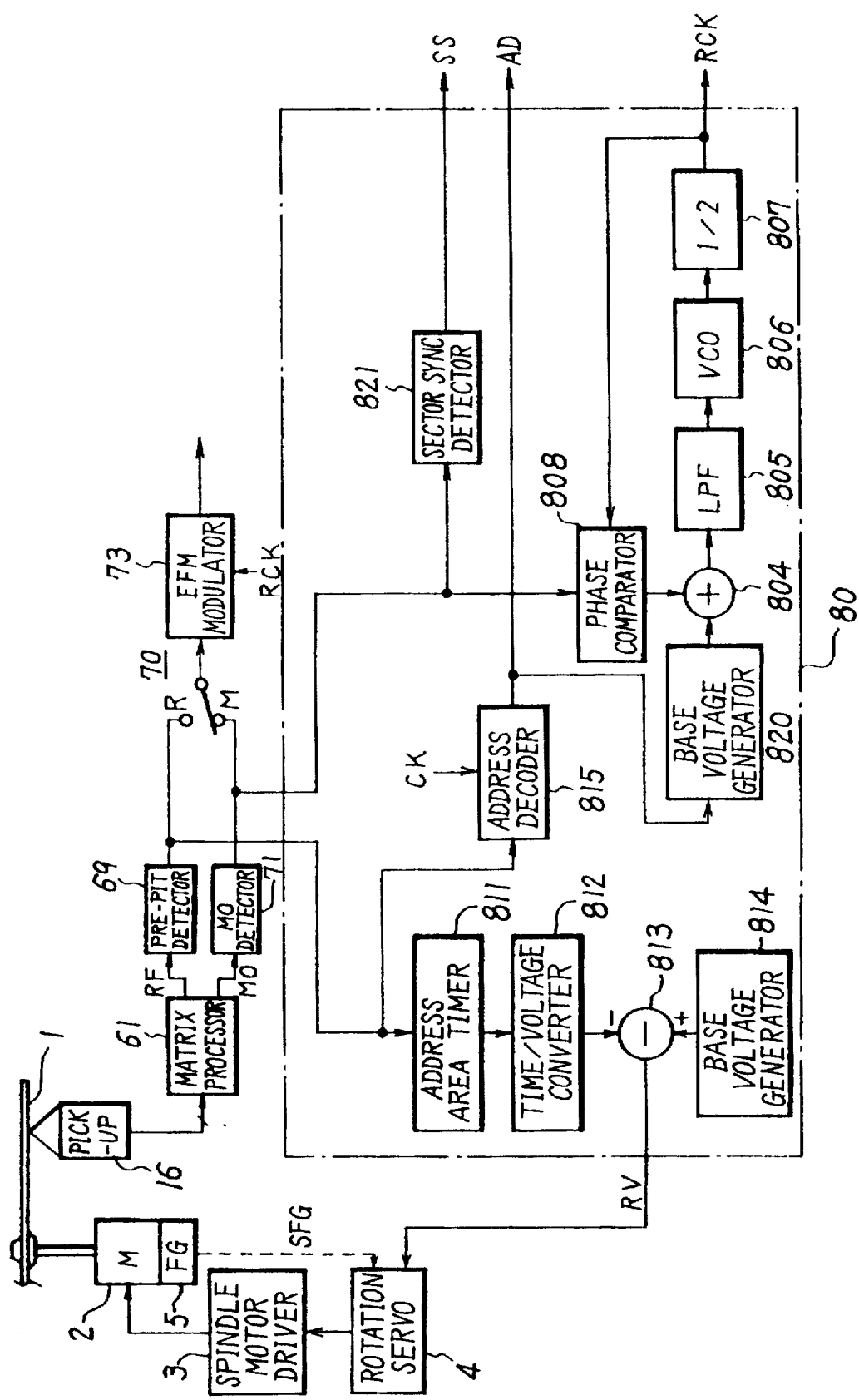
FIG. 15 is another block diagram of the disk drive reproducing circuit in accordance with the present invention.

The operation of reproducing data from a CD-MO at a constant angular velocity in accordance with the present invention is described with reference to FIG. 15. During reproduction of a CD-MO, pick-up unit 16 reproduces stored data from one sector on the CD-MO which includes address data stored in the address area of the sector and data stored in the data area of the sector (FIG. 2). As previously described, matrix processor 61 supplies an RF signal which contains the address data to pre-pit detector 69 and provides an MO signal which contains the data stored in the data area to MO detector 71.

The address data detected by pre-pit detector 69 is supplied to PLL circuit 80 which generates the rotation velocity variation voltage signal RV which controls the rotational velocity of the CD-MO in a manner similar to that described with reference to FIG. 14 when recording on a CD-MO.

MO detector 71 supplies the detected MO data to EFM modulator 73 via switch 70 and to PLL circuit 80. PLL circuit 80 produces read clock pulses RCK which have a frequency and phase which correspond to the frequency and phase of the detected data supplied by pre-pit detector 69. Then, and in accordance with the present invention, read clock pulses RCK are supplied to EFM demodulator 73 which demodulates the reproduced data at the frequency and phase of read clock pulses RCK. The process of generating read clock pulses RCK when reproducing data from a CD-MO in accordance with the present invention is described below.

Pre-pit detector 69 supplies the detected address data to address decoder 815 which extracts address data AD in a manner similar to that described with reference to FIG. 14. Address decoder 815 supplies address data AD to controller 19 (FIG. 6) and to a base voltage generator 820 during reproduction of data from a CD-MO. Base voltage generator 820 generates a base voltage which corresponds to the zone A, B, or C from which the data was reproduced and which is identified by the reproduced address. The generated base voltage is supplied to voltage control oscillator 806 via adder 804 and low pass filter 805 which produces an oscillating signal. VCO 806 supplies the oscillating signal to frequency divider 807 which divides the oscillating signal frequency in half to produce the read clock pulses RCK which have a frequency equal to the bit frequency of the data detected in pre-pit detector 69.

Read clock pulses RCK are supplied to phase comparator 808 which compares the phase of the signal supplied by MO detector 71 with the phase of read clock pulses RCK to produce a phase correction signal. The phase correction signal is supplied to adder 804 which corrects the phase of the base voltage signal supplied by base voltage generator 820. Therefore, PLL circuit 80 produces read clock pulses RCK which have a frequency and phase that correspond to the frequency and phase of the detected data supplied by MO detector 71. EFM demodulator 73 demodulates the reproduced MO data at the frequency and phase of read clock pulses RCK.

In addition, MO detector supplies the detected data to a sector synchronizing signal detector 821 in PLL circuit 80 which detects the sync signal SS stored in the sync area of the reproduced sector (FIG. 2) and supplies the detected sync signal SS to reproduced signal processing circuit 72 (FIG. 6) to identify the beginning of the data reproduced from the data area of the sector.

As previously described, switches 70, 74 and 77 (FIGS. 6, 13 and 15) are switched and PLL circuit 80 operates (FIGS. 13–15) in a manner dependent upon whether disk 1 is a CD-ROM or a CD-MO. In one embodiment of the present invention, controller 19 controls these circuits in response to the type of disk detected when signals are reproduced therefrom. In this embodiment, the disk type may be identified by determining the deflection rate of the reproduced signal, where a CD-ROM has a deflection rate of approximately 95% and a CD-MO has a deflection rate of approximately 20%. In another embodiment, identification of the disk type may be accomplished by determining whether a phase encode part (PEP) is stored in the innermost track of the disk. CD-ROMs do not contain this code but CD-MOs do.

While the present invention has been particularly shown and described in conjunction with preferred embodiments thereof, it will be readily appreciated by those of ordinary skill in the art that various changes and modifications may be made without departing from the spirit and scope of the invention. For example, although specific circuits have been described, the present invention is not limited to these circuits and may utilize equivalent or alternative circuits which provide similar functions as is known in the art (e.g., CIRC decoders 75 and 76 may be contained within a single decoder circuit).

As another example, although the present discussion is directed to a CD-MO which has three concentric zones A, B and C, the present invention is not limited solely to this arrangement and may record and reproduce data from disks having other data arrangements (e.g., 4 zones).

Therefore, it is intended that the appended claims be interpreted as including the embodiments described herein, the alternatives mentioned above, and all equivalents thereto.

What is claimed is:

1. Apparatus for adjusting a rotational velocity of a disk storage medium having a plurality of tracks, each of said tracks having therein a plurality of address areas and each of said address areas having respective address data stored therein, said apparatus comprising:

means for rotating said disk storage medium at a rotational velocity;

means for reproducing address data from an address area on said disk storage medium;

means for measuring an amount of reproduction time for reproducing address data from one of said address areas; and means for adjusting said rotational velocity of said disk storage medium in accordance with the measured amount of reproduction time to reproduce address data from said one of said address areas such that said rotational velocity of said disk storage medium remains substantially constant.

2. The apparatus of claim 1, wherein said means for adjusting said rotational velocity operates to maintain a substantially constant rotational velocity regardless of the track from which said address data was reproduced.

3. Apparatus for adjusting a rotational velocity of a disk storage medium having a plurality of address areas, each of said address areas having respective address data stored therein, said apparatus comprising:

means for rotating said disk storage medium at a rotational velocity;

means for reproducing address data from an address area on said disk storage medium;

means for measuring an amount of reproduction time for reproducing said address data from said address area; and means for adjusting said rotational velocity of said disk storage medium in accordance with said measured amount of reproduction time such that said rotational velocity of said disk storage medium remains substantially constant, said means for adjusting said rotational velocity being comprised of:

means for converting the measured amount of reproduction time to a first voltage level;

means for supplying a second voltage level representing an ideal reproduction time;

means for subtracting the first voltage level from said second voltage level to produce a correction voltage level; and means for varying the rotational velocity of the disk storage medium in accordance with the correction voltage level.

4. Method of adjusting a rotational velocity of a disk storage medium having a plurality of tracks, each of said tracks having therein a plurality of address areas and each of said address areas having respective address data stored therein, said method comprising the steps of:

rotating said disk storage medium at a rotational velocity;

reproducing address data from an address area on said disk storage medium;

measuring an amount of reproduction time for reproducing address data from one of said address areas; and adjusting the rotational velocity of said disk storage medium in accordance with the measured amount of reproduction time to reproduce address data from said one of said address areas such that said rotational velocity of said disk storage medium remains substantially constant.

5. The method of claim 4, wherein said step of adjusting is carried out so as to maintain a substantially constant rotational velocity regardless of the track from which said address data was reproduced.

6. Method of adjusting a rotational velocity of a disk storage medium having a plurality of address areas, each of said address areas having respective address data stored therein, said method comprising the steps of:

rotating said disk storage medium at a rotational velocity;

reproducing address data from an address area on said disk storage medium;

measuring an amount of reproduction time for reproducing said address data from said address area; and adjusting said rotational velocity of said disk storage medium in accordance with said measured amount of reproduction time such that said rotational velocity of said disk storage medium remains substantially constant, said step of adjusting said rotational velocity being comprised of the steps of:

converting the measured amount of reproduction time to a first voltage level;

supplying a second voltage level representing an ideal reproduction time;

subtracting the first voltage level from said second voltage level to produce a correction voltage level; and varying the rotational velocity of the disk storage medium in accordance with the correction voltage level.

* * * * *